UNITED STATES PATENT OFFICE.

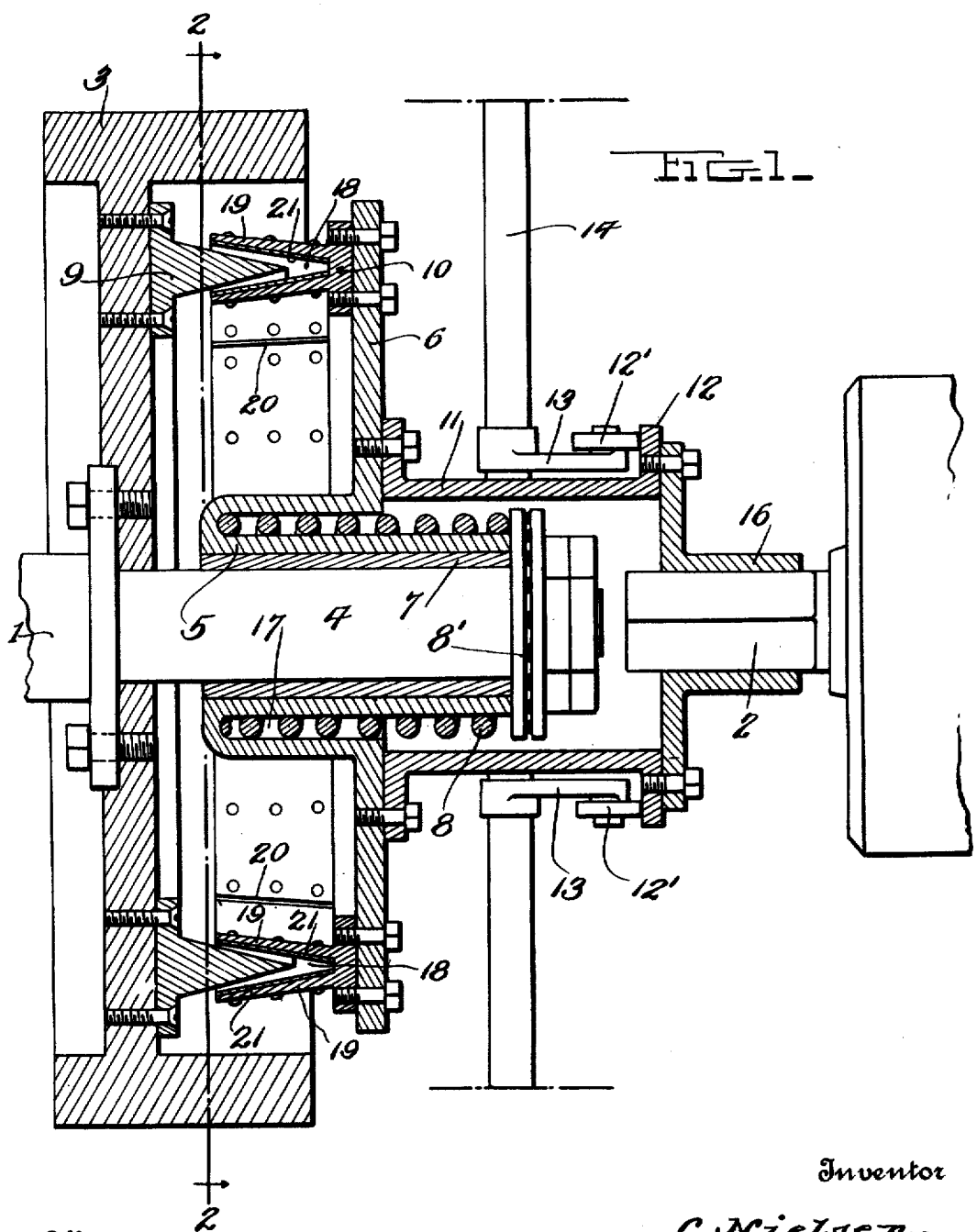

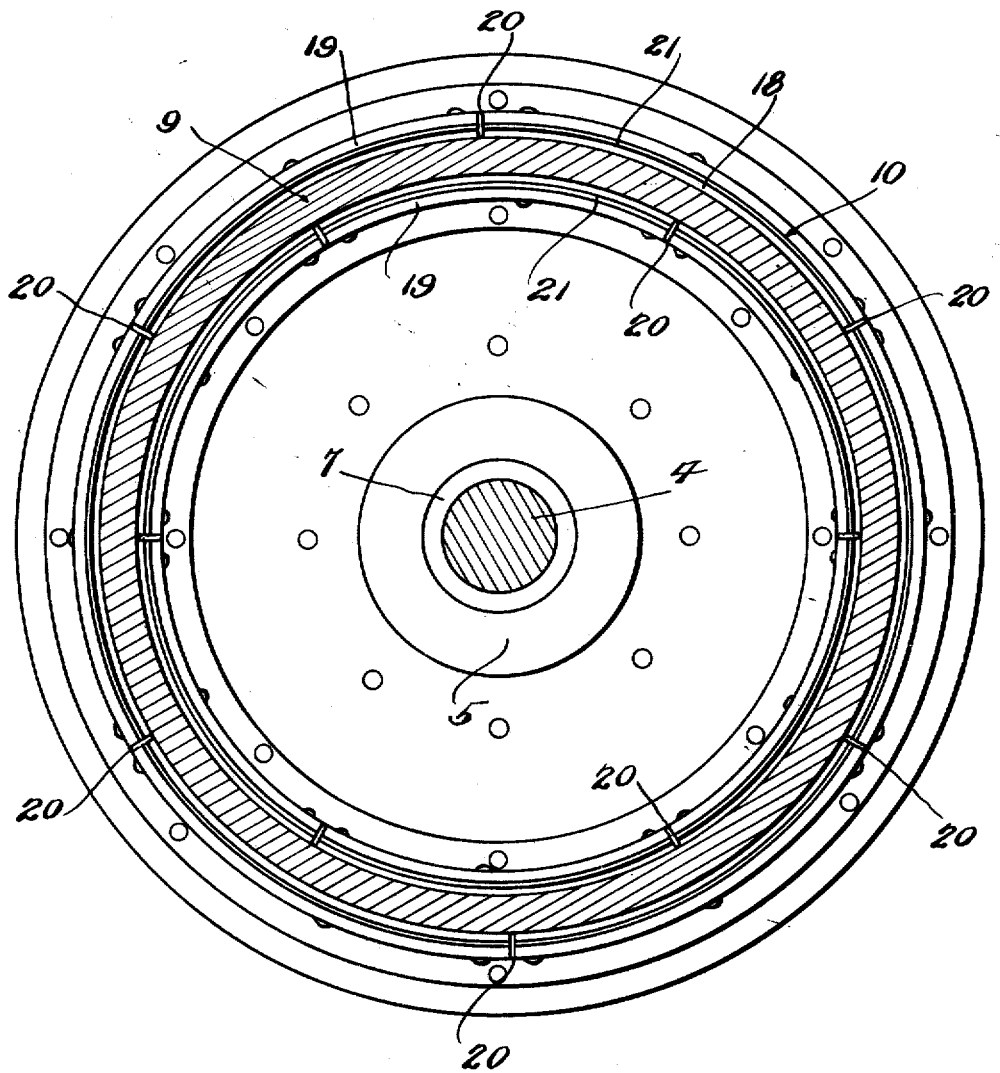

CHRISTIAN NIELSEN, OF LAKE CHARLES, LOUISIANA, ASSIGNOR OF FORTY-NINE ONE-HUNDREDTHS TO ALBERT W. CARLSON, OF LAKE CHARLES, LOUISIANA.

CLUTCH.

1,317,811.  Specification of Letters Patent.  Patented Oct. 7, 1919.

Application filed August 23, 1917. Serial No. 187,825.

*To all whom it may concern:*

Be it known that I, CHRISTIAN NIELSEN, a citizen of the United States, residing at Lake Charles, in the parish of Calcasieu and State of Louisiana, have invented certain new and useful Improvements in Clutches; and I do declare the following to be a full, clear, and exact description of the invention, such as will enable others skilled in the art to which it appertains to make and use the same.

My invention relates broadly to improvements in devices intended for connecting and disconnecting a pair of shafts for rotation either in unison or separately, the device being intended principally for operatively connecting the propeller or transmission shaft of automobiles with the engine shaft, although it is to be understood that the invention may be employed wherever applicable.

One object of the invention is to provide a simple and inexpensive, yet a highly efficient and durable clutch which will gradually "pick up" without "grabbing".

In carrying out the above object, a further aim of the invention is to so construct the coacting male and female members of the clutch as to cause them to gradually engage, so that the car may be started and gears shifted, without a "jerky" motion.

With the foregoing in view, the invention resides in the novel features of construction and unique combinations of parts to be hereinafter fully described and claimed, the descriptive matter being supplemented by the accompanying drawings which form a part of this specification and in which:—

Figure 1 is a horizontal longitudinal section of the improved clutch; and

Fig. 2 is a vertical transverse section on substantially the plane of the line 2—2 of Fig. 1.

In the drawings above briefly described, the numerals 1 and 2 designate the shaft of an engine and a transmission shaft, respectively, which are to be connected and disconnected by means of the improved clutch, whenever required. The shaft 1 carries the usual fly wheel 3 and in rear of said wheel is reduced to form a stub 4 upon which the hub 5 of a disk or the like 6 is rotatably mounted, a suitable bushing 7 being preferably located between said hub and stub for obvious reasons.

The rear end of the stub 4 carries a suitable thrust bearing 8' against which the rear end of a coil spring 8 bears, the front end of said spring resting against the hub 5 so that its tension is normally exerted to force the disk 6 forwardly to interengage the male and female members 9 and 10. For the purpose of retracting the disk 6 to throw the clutch out, a cylindrical casing 11 is rigidly secured at its front end to the disk 6, whereas the rear end of said casing is provided with an outstanding annular flange 12 against which a pair of rollers 12' bear, said rollers being carried by the usual crank arms 13 on the transverse rock shaft 14 which is equipped with a clutch pedal (not shown). The rear end of the casing 11 is closed and is provided with a hub 16 which is slidable but non-rotatable on the transmission shaft 2, so that when the rock shaft 14 is properly moved, the entire casing may slide rearwardly against the tension of the spring 8, to disengage the female member 10 from the male member 9. When the pedal is released, however, the spring again exerts its tension to throw the clutch into operative position. It is to be observed that the casing 11 receives therein the rear portion of the stub 4, and the thrust bearing 8, said casing coacting with an annular socket 17 in the hub 5, in forming a housing to be packed with grease for lubricating the thrust bearing as well as the running connection between the hub and the stub 4, it being within the socket 17 that the front end of the spring 8 is positioned as will be clear from the drawings.

The male member 9 of the clutch is in the form of a ring which is V-shaped in transverse section, the narrow edge of the ring being disposed rearwardly. The female member 10 is formed of a ring rigidly secured to the disk 6 and having an annular V-shaped socket 18 to receive the male member therein, the walls 19, on opposite sides of the socket 18, being comparatively thin so that they may constitute resilient flanges for yielding engagement with the member 9.

It will be observed by reference to Fig. 1 that the angle existing between the walls of the socket 18, is less than that between the sides of the ring or member 9, said walls being thus caused to spring outwardly when the two members of the clutch are interengaged, so that the clutch will pick up gradually yet will effectively hold when totally thrown in. To facilitate the outward yielding of the walls 19 they are slit transversely at intervals as indicated at 20. In all cases, either the male or the female member of the clutch will be provided with a suitable covering such as asbestos, whereby the frictional engagement between the two members is greatly increased. In the present embodiment of the invention, the walls of the socket 18 are shown provided with a lining 21, but it will be obvious that the walls of the male member 9 could well be equipped with the friction creating material should occasion demand. Furthermore, although the male and female members 9 and 10 are shown mounted respectively on the fly wheel 3 and the disk 6, it is obvious that these parts could be interchanged and in fact that any other preferred carrying means could well be employed. I prefer, however, to drive the male member 9, since I find that better results are obtained in this manner.

From the foregoing, taken in connection with the accompanying drawings, it will be obvious that although I have provided a clutch which will be simple and inexpensive, it will be highly efficient and durable and applicable to a wide range of uses. It will be understood that the device may be constructed in numerous sizes and proportions for different uses, and that any suitable materials may be employed. Furthermore, although I have shown certain specific details for obtaining probably the best results, I wish it understood that within the scope of the invention as claimed, numerous minor changes may well be made.

I claim:

In a clutch, a rotatable disk, a ring concentric with said disk, secured to one side of the latter, and extending laterally therefrom, the inner and outer sides of said ring converging toward the ring's outer edge, a second rotatable disk axially alined with said first named disk, a second ring secured to said second disk opposite said first named ring, said second ring being V-shaped in transverse section to receive said first named ring and having its two sides disposed at a lesser angle to each other than the sides of said first named ring, said sides of the second named ring being transversely split to render them sufficiently resilient to spread and snugly grip said first named ring, means for forcing said disks toward each other, and means for separating them.

In testimony whereof I have hereunto set my hand in the presence of two subscribing witnesses.

CHRISTIAN NIELSEN.

Witnesses:
C. R. CLINE,
SAM KUSHNER.